United States Patent [19]

Bertocchi

[11] Patent Number: 5,635,941

[45] Date of Patent: Jun. 3, 1997

[54] METHOD AND APPARATUS FOR FEEDING OVER-MODULATED MESSAGE SIGNALS TO ANTENNAS OF AN ANTENNA ARRAY

[75] Inventor: Giuseppe Bertocchi, Bergamo, Italy

[73] Assignee: Alcatel N.V., Rijswijk, Netherlands

[21] Appl. No.: 413,535

[22] Filed: Mar. 30, 1995

[30] Foreign Application Priority Data

Mar. 31, 1994 [IT] Italy ................... MI94A0612

[51] Int. Cl.$^6$ ............... G01S 1/44; G01S 1/16; G01S 5/04
[52] U.S. Cl. ............ 342/405; 342/408; 342/436
[58] Field of Search ................ 342/401–405, 342/398, 406, 436, 408

[56] References Cited

U.S. PATENT DOCUMENTS

| | | | |
|---|---|---|---|
| 3,896,444 | 7/1975 | Lin | 342/406 |
| 4,050,074 | 9/1977 | Toman | 342/408 |
| 4,086,597 | 4/1978 | Sinksy et al. | 342/376 |
| 4,129,870 | 12/1978 | Toman | 342/408 |
| 4,382,259 | 5/1983 | Becavin et al. | 342/406 |

OTHER PUBLICATIONS

"A Double–Sideband Doppler VHF Omnirange Beacon" by B.R. Johnson et al. vol. 15, AWA Technical Review, No. 1, 1973 pp. 1 – 12.

"The Phillips Doppler VOR Beacon RN 200" by F.L. van den berg, Philips Telecommunication Review, vol. 34, no. 1, Apr. 1976, Doppler VOR beacon RN 200, pp. 1 – 10.

"Principles of Communication Systems" by Herbert Taub, et al. Principles of Communication Systems, Chapter 3 McGraw Hill, 1971.

*Primary Examiner*—Gregory C. Issing
*Attorney, Agent, or Firm*—Ware, Fressola, Van Der Sluys & Adolphson LLP

[57] ABSTRACT

A feeding method and device, particularly for a Doppler VOR system, and to a Doppler VOR system using such a feeding device. The feeding method performs a blending function, which is an approximation of the sinX/X function limitedly to the three central lobes, and is obtained by amplitude overmodulation of a single signal according to a periodic function. The blending function can be controlled through the control of the periodic function.

10 Claims, 4 Drawing Sheets

METHOD AND APPARATUS FOR FEEDING OVER-MODULATED MESSAGE SIGNALS TO ANTENNAS OF AN ANTENNA ARRAY

TECHNICAL FIELD

The present invention relates to a feeding method and device, particularly for a Doppler VOR system, to a modulator suitable for the same and to a Doppler VOR system.

BACKGROUND OF THE INVENTION

Many systems, among which civil and military navaid systems (TACAN, VOR, . . . ), radar systems and so on, require radio signal transmission with a moving radiation pattern (generally in a periodic fashion), very often the transmission rotating around about an axis.

Up to some decades ago, such motion effect was obtained by physically moving the transmission antenna. This technique posed a problem for the reliability and accuracy of such systems.

As soon as the electronic technology made it possible, such systems were slowly replaced with more modern systems in which the motion of the radiation pattern was simulated through an antenna array fed with electrical signals having phase and/or amplitude variable with time in a suitable relation with each other. In such systems it is therefore necessary to provide antennas with feeding devices capable of generating electrical signals having the suitable characteristics. This often involves the need for switching the same electrical signal from one antenna to another as it occurs e.g. in Doppler VOR systems. It is well known that, in order to obtain a perfect simulation of the motion, such switching must be gradual.

In the course of the description reference will only be made to Doppler VOR systems for simplicity but, as already stated, the same problems can be encountered in other systems.

A VOR (Very high frequency OmniRange) system allows an aircraft equipped with a suitable receiver to be provided with bearing information relative to a ground beacon whose geographical position is known.

The VOR radiates in a frequency band (108–118 MHz) a signal whose quality largely depends upon the place in which the VOR is installed. In fact, the omnidirectional radiation is subject to distortion due to undesired reflections by objects.

For this reason, a conventional VOR is advantageously replaced with a Doppler VOR.

In a Doppler VOR system, a "reference" signal corresponding to a VHF carrier amplitude modulated by a sine wave having a frequency of 30 Hz is transmitted according to an omnidirectional pattern, and a "variable" signal corresponding to two sidebands at +/−9960 Hz of the VHF carrier frequency is modulated by a sine wave having a frequency of 30 Hz, according to a directional pattern carrying azimuth information. These two sidebands are emitted independently from each other through separated circuits. The omnidirectional pattern is radiated through a central antenna while the other pattern is obtained by rotating two antennas on a circle, positioned diametrally opposite from each other and each fed by one of the two sidebands at +/−9960 Hz of the carrier. The revolution frequency of these antennas is 30 Hz.

For practical reasons, as already mentioned, the physical rotation of the antennas which emit the two sidebands is simulated through the gradual switching of the D-VOR signal between the fixed antennas of a circular array in such a way as to simulate the progressive motion of the emitting point from one antenna to the next one. More specifically, one carries out, in general, the switching of a radiofrequency signal amplitude modulated in accordance with a suitable time function, called a blending function, which is able to attenuate the spurious modulations that are generated because of the discretization of the antennas themselves.

Several solutions for the emission of the two sidebands of the amplitude modulation of the VHF carrier exist at present; in particular the emission of only one sideband, of two sidebands alternately, and of two sidebands simultaneously over two antennas or two diametrically opposed antenna groups. The present invention can be applied to each of these solutions.

More details on operation of D-VOR systems and problems connected with their design, in particular of the blending function, of the distribution device and of the antenna array, are described by B. R. Johnson and J. G. N. Lee in "A Double-Sideband Doppler VHF Omnirange Beacon" - AWA Technical Review, Vol. 15, No. 1, 1973 and by F. L. van der Berg in "The Philips Doppler VOR Beacon RN200" - Philips Telecommunication review, vol. 34, No. 1, April 1976.

It is clear that the design of a new feeding device for a Doppler VOR system will have to face well known problems, such as the choice of a suitable blending function, the generation of the same, and the complexity of the distribution device.

The ideal blending function is notoriously sinX/X (provided that there is no interaction between the antennas of the array) but, given the physical impossibility of realizing this function, approximations thereof are used. In the above-mentioned articles, the use of the function sinX is limited to a half period.

From U.S. Pat. No. 3,896,444, a blending function in a Doppler VOR system is known that is an approximation of the function sinX/X, restricted to the three center lobes, obtained through combination of two amplitude modulated signals according to a rectified cosX function.

SUMMARY OF THE INVENTION

The object of the present invention is to provide a method and a feeding device for systems having an antenna array which implements a blending function similar to sinX/X, through circuitry which is not too complex and critical and that does not significantly waste the energy of the signal entering the feeding device.

This object is achieved by using a blending function that is an approximation of the sinX/X function restricted to the three central lobes, which is obtained by amplitude overmodulation of a single signal by a periodic function. The blending can be controlled through the control of the periodic function.

BRIEF DESCRIPTION OF THE DRAWINGS

The present invention will become more apparent from the following description of a not limiting embodiment thereof, suitable for a Doppler VOR system, taken in conjunction with the attached drawings, in which.

BEST MODE FOR CARRYING OUT THE INVENTION

Prior to further describing the present invention it is better to clarify what overmodulation means. An amplitude modulator generally has two inputs and one output. One input is provided with the carrier signal and the other input with the modulating signal, generally at a much lower frequency. At the output, a modulated signal is emitted. The so-called modulation index depends on the amplitudes of the two input signals, in particular, in case of sinusoids, if the amplitude of the carrier is exactly twice the amplitude of the modulating signal, the modulation index is 100% (percent); if it is more than twice, the index is lower than 100% (percent); while if it is less than twice, the index is greater than 100% (percent). In the latter case one speaks of over-modulation but only when the envelope of the modulated signal passes through zero does an inversion in phase of the carrier sinusoid and not its cancellation take place. For a better and exhaustive treatment of the amplitude modulation one may refer to H. Taub, D. L. Schilling, "Principles of Communication Systems", McGraw Hill, 1971 and particularly to chapter 3 "Amplitude Modulation Systems". Normally telecommunication apparatuses are not adapted to handle overmodulated signals and conventional amplitude modulators do not output any signal when the modulating signal exceeds a certain limit.

The method of the present invention is now described by reference to FIG. 3.

Such a method allows the antennas of the circular array of a Doppler VOR system to be fed with the D-VOR signal, or more precisely with its sidebands. The method uses a filter that realizes a blending function for gradually switching such a signal between the antennas by modulating the amplitude of the D-VOR signal with a periodic signal having a modulation index greater than 100% (percent) and providing each antenna with a corresponding time fraction of the modulated D-VOR signal at the output of the filter means.

Figure 3:
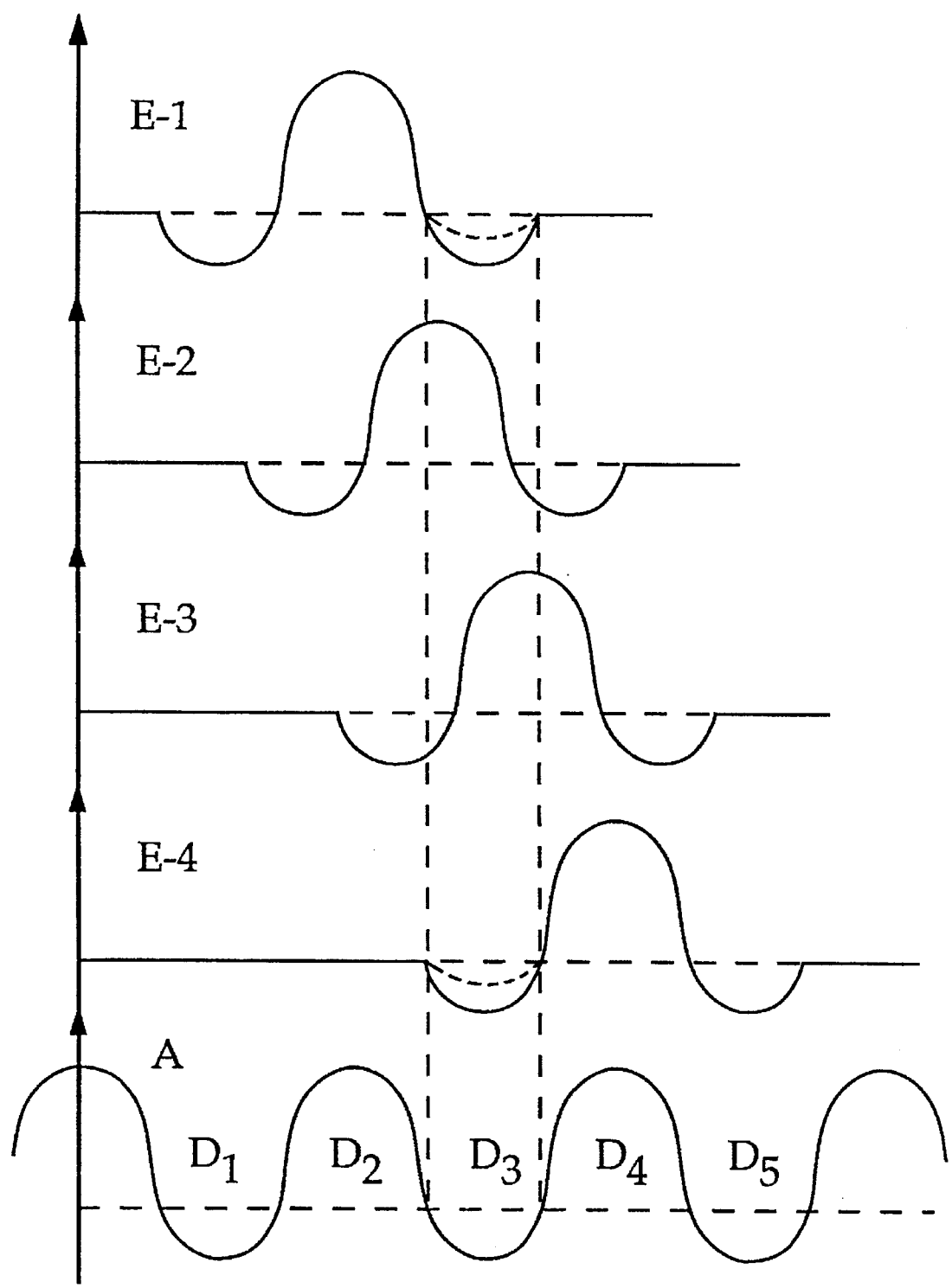
FIG. 3 shows a time diagram of signals outgoing from and coming into the switching means of the device of FIG. 1.

The curve labelled A in FIG. 3 is the envelope of the modulated D-VOR signal at the output of the filter means. As can be seen when the three consecutive time intervals labelled D1, D2, D3 are considered, the resulting function is similar to the function sinX/X, restricted to the three central lobes.

The curves labelled E-1, E-2, E-3, E-4 in FIG. 3 are the envelopes of the signals provided respectively to antennas E-1, E-2, E-3, E-4 of a Doppler VOR System, which are physically adjacent in the circular array.

The modulated D-VOR signal can be distributed to the various antennas by reserving a different time fraction thereof to each antenna: e.g. intervals D1 and D2 to antenna E-1, intervals D3 and D4 to antenna E-4, and so on.

There is also the possibility that such time fractions partially overlap each other: e.g. intervals D1, D2, D3 to antenna E-I, intervals D3, D4, D5 to antenna E-4; thus better approximating the function sinX/X.

There is also the possibility that such time fractions totally overlap each other.

In FIG. 3 a sinusoid with a modulation index of 200% has been chosen as the periodic signal, which is simple to synthesize. The person skilled in the art will be able to make the most appropriate choice.

In a partial overlapping approach, during a first positive alternation (D2) of the amplitude modulation, the modulated D-VOR signal is fed to a first antenna (E-1); during a first negative alternation (D3) subsequent the first positive alternation (D2), the modulated D-VOR signal is power-divided and fed simultaneously to the first antenna (E-1) and to a second antenna (E-4) logically adjacent to the first one; and, during the following positive and negative alternations, the modulated D-VOR signal is fed gradually to logically adjacent antennas until all the antennas of the array are covered.

The concept of logical adjacency will be explained through an example.

In order to better simulate the progressive motion of the emitting point from the position of an antenna, for example E-1, to that of another one, for example E-4, it is possible to place further antennas, for example antennas E-2 and E-3, between antenna E-1 and antenna E-4.

The modulated signals to be provided to these further antennas are shown in FIG. 3 and correspond to the signal for antenna E-1 phase shifted respectively 120 and 240 degrees.

Clearly these further modulated signals cannot be obtained from signal A through a simple switching and will need, for example, separate generation.

According to the above, antenna E-4 is logically adjacent to antenna E-1 as far as the switching of signal A is concerned, and is physically adjacent to antenna E-3.

Having described the method, there follows a description of the apparatuses which allow the realization of such a method.

Figure 1:
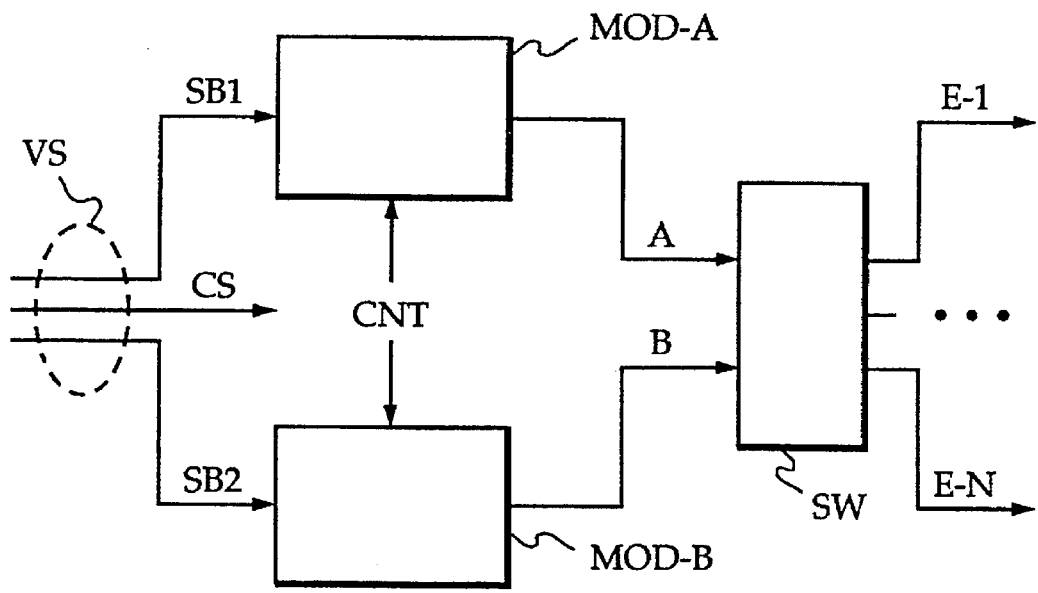
FIG. 1 illustrates a block diagram of a feeding device in accordance with the present invention.

In FIG. 1 a block diagram is shown of a feeding device in accordance with the present invention, suitable for Doppler VOR systems with simultaneous emission of the two sidebands.

The feeding device receives at its inputs a D-VOR signal, labelled VS, which is composed of a carrier signal CS, that contains the "reference" information and passes directly to the central antenna of the Doppler VOR system, and of two sidebands SB1 and SB2, which together provide the azimuth information and therefore can be considered a message signal. It provides at its outputs N, radiofrequency signals for the N antennas E-1, ... , E-N of the circular array of the Doppler VOR system.

The two sidebands SB1 and SB2 are respectively fed to the inputs of filter means formed essentially by two identical amplitude modulators MOD-A and MOD-B whose function is to time-filter the two sidebands with a blending function and which generate at their respective outputs two modulated message signals A and B. Naturally, if the Doppler VOR system is of the type emitting the two sidebands alternately or emitting one sideband only, the duplication of the devices and of the signals would be unnecessary.

The modulated message signals A and B are fed at the inputs of switching means SW that switch them between the antennas E-1, ... , E-N. Such switching is gradual due to the filtering of the two modulators.

A control logic unit, not shown in FIG. 1, is on the other hand necessary for controlling the switching means SW and the modulators MOD-A and MOD-B.

In order to implement the method in accordance with the present invention, amplitude modulators MOD-A and MOD-B must modulate the two sidebands SB1 and SB2 with a periodic signal with a modulation index greater than 100% (percent). Such a periodic signal is fed to the two modulators in the form of a modulation control signal CNT, typically in the form of a sequence of digital patterns.

In the case of a single modulated message signal, the switching means SW subdivides it into time fractions, determined by the control logic unit, and feeds in succession each time fraction to an antenna, e.g. the first time fraction to antenna E-1, the second one to antenna E-2 and so on. In the case of two signals, in comparison, the switching means SW subdivides it into time fractions determined by the control logic unit, and feeds in succession the time fractions to two different antennas (in case of Doppler VOR systems with two antennas that are located in opposite positions in the circular array), e.g. the first time fraction of the first signal to antenna E-1 and at the same time the first time fraction of the second signal to antenna E-25; and the second time fraction of the first signal to antenna E-2 and at the same time the second fraction of the second signal to antenna E-26.

More advantageously, both in the case of a single modulated message signal and in the case of two, the switching means SW allows particular time fractions to be fed to at least two different antennas, e.g. those logically adjacent, simultaneously according to predetermined power ratios.

Moreover one can arrange switching means SW such that the two cases described previously may follow alternately.

Figure 2:
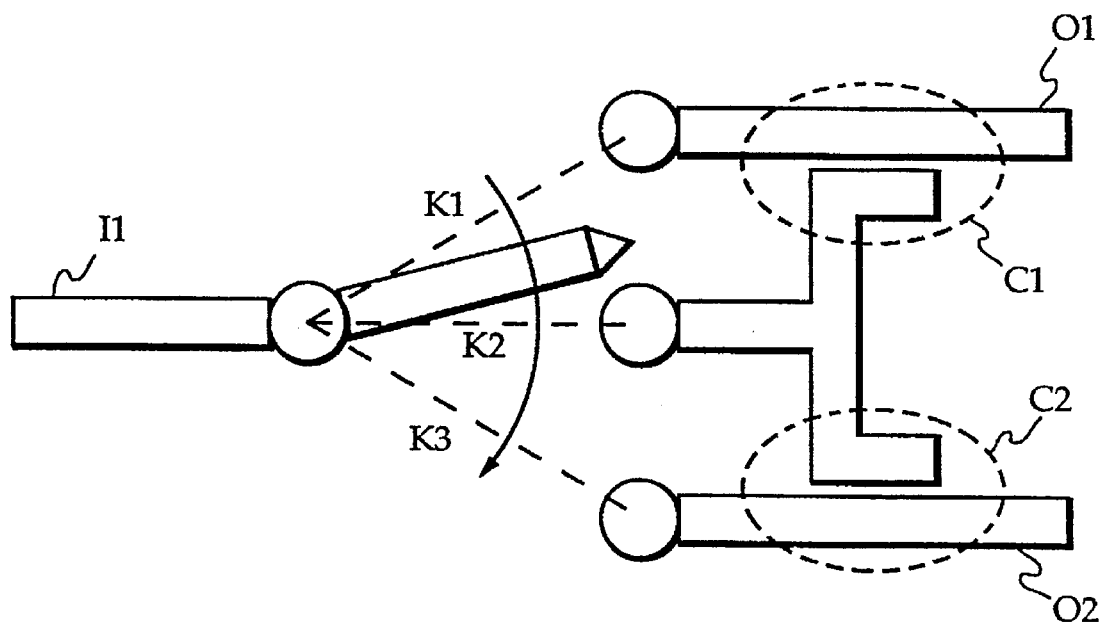
FIG. 2 illustrates a switch/divider which can be used in the switching means of the device of FIG. 1.

Such simultaneous feeding to two different antennas may be obtained, e.g., through the device represented in FIG. 2 and called switch/divider.

The switch/divider has an input I1 and two outputs 01 and 02 and three operating positions K1, K2, K3. A first position K1 corresponds to the direct connection of the input I1 with the output 01, a second position K3 corresponds to the direct connection of input I1 with output 02, and a third position K2 corresponds to the simultaneous connection of input I1 with the two outputs 01 and 02 and a power division to the two outputs through two elements C1 and C2. Such a structure can be advantageously realized by a microstrip architecture and controlled PIN diodes, and with suitable transmission lines.

Naturally the switch/divider represented in FIG. 2 can be modified according to design requirements, providing a higher number of outputs or of an intermediate position, characterized by different power division ratios: e.g. in a first intermediate position it could provide ¼ of the power at the output 01 and ¾ at the output 02; in a second intermediate position it could provide ½ of the power at the output 01 and ½ at the output 02; in a third and last intermediate position it could provide ¾ of the power at the output 01 and ¼ at the output 02.

Prior to describing in more detail how switching means SW can be realized, the structure of a modulator according to the present invention and particularly advantageous for use in the feeding device according to the present invention will be described by reference to FIG. 4.

Figure 4:
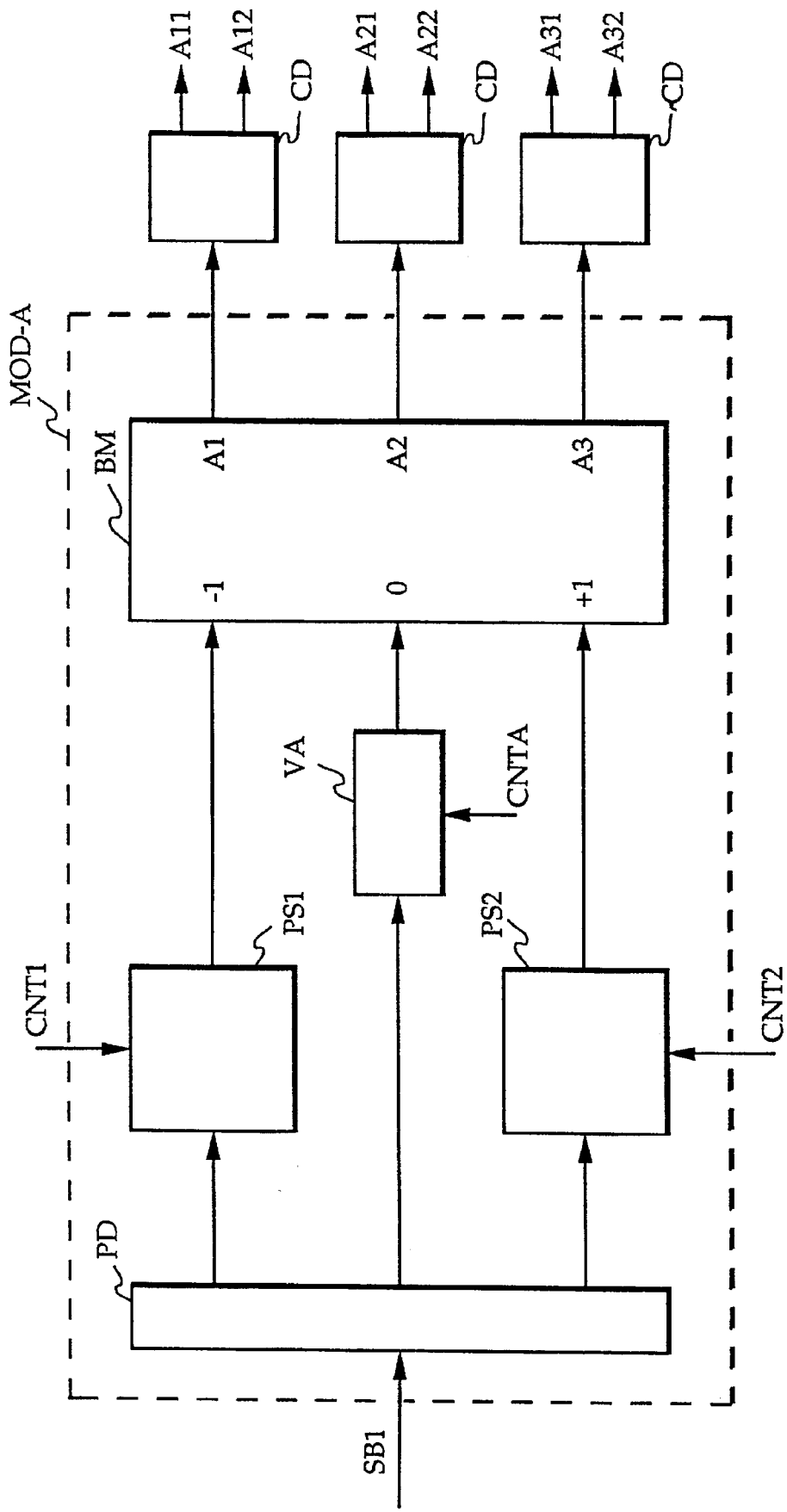
FIG. 4 is a block diagram of a modulator according to the present invention which can be used in the device of FIG. 1.

In FIG. 4 it can be seen that the structure of amplitude modulator MOD-A is identical to the one of MOD-B.

Modulator MOD-A receives at its input the first sideband SB1 and outputs three modulated message signals A1, A2, A3 which are identical to each other but 120 degrees out of phase with each other and that correspond to the modulated message signal A of FIG. 1. Naturally the modulator MOD-B receives at its input the second sideband SB2 and outputs three modulated message signals B1, B2, B3, corresponding to the modulated message signal B of FIG. 1.

The choice of generating three identical message signals is particularly advantageous, as will be seen, as a compromise between wasted power and circuit simplicity. It is clear however, that for a person skilled in the art, a different number of outputs is possible; even one in the boundary case.

The amplitude modulator MOD-A comprises:
- a power divider PD receiving at its input the first sideband SB1, and having a central output and two side outputs having predetermined power ratios with the input, and such that the power of the two side outputs is equal,
- at least two phase shifters PS1 and PS2 controlled by phase-shift control signals CNT1 and CNT2 corresponding to the sole modulation control signal CNT in FIG. 1, having inputs electrically connected to two side outputs of the power divider PD,
- a variable attenuator VA controlled by an attenuation control signal CNTA, receiving at its input the central output of the power divider PD, and
- a Butler matrix BM having three inputs (−1, 0, +1), inputs −1 and +1 being connected to the outputs of the two phase shifters PS1 and PS2, and the input 0 being connected to the output of the variable attenuator VA.

Such a modulator is based upon the known representation of the amplitude modulation through rotating vectors: input 0 corresponds to the vector of the carrier and inputs −1 and +1 correspond to the two vectors of the modulating signal, which by rotating in the opposite direction and adding up to the first one, determine the modulation. The rotation of vectors is obtained by varying the phase of the corresponding signals through phase-shifters PS1 and PS2, while the addition is obtained through the Butler matrix BM.

The modulation index at the outputs of the Butler matrix BM depends upon the reciprocal dimension of the vectors and therefore by the partition ratio of the power divider PD (very easily changeable). In a preferred realization, the power divider divides the power into three equal parts, with the resulting modulation index equal to 200% (percent).

The variable attenuator VA may be used for a fine adjustment of the modulation index, either during installation of the Doppler VOR system or during operation as a result of monitoring information.

In addition, the variation of its attenuation, if quick enough, may influence the shape of the blending function. This possibility is useful if slightly different blending functions are used for different antennas and/or a not perfectly symmetrical blending function is necessary.

The presence of the variable attenuator VA is not strictly necessary but is advantageous.

In view of the generation of three identical, out-of-phase signals A1, A2, A3, and the use of a Buffer matrix, the wasted power in the modulator is extremely limited, as the sum of the powers of the signals is fairly shared between the three outputs A1, A2, A3 without being reflected or sent to internal loads.

The index of the Buffer matrix and consequently the number of outputs, is chosen according to the preservation level of the spectral characteristics of the frequency modulation and to the cancellation level of the spurious amplitude modulations due to discretization of the antennas. Such an index is advantageously chosen equal to the number of the antennas divided by the frequency modulation index.

Moreover, such a modulator is very versatile as far as the blending function to be applied is concerned. In fact, since the controlled phase shifters PS1 and PS2 are often realized by a microstrip architecture and PIN diodes controlled by numeric signals, its shape depends on the sequence of numbers fed to the phase shifters. Such numbers are very easy to change, even in real time.

From the above it is apparent that the feeding device parameters can be changed easily, and their determination can be made analytically, tentatively, or both.

Figure 5:
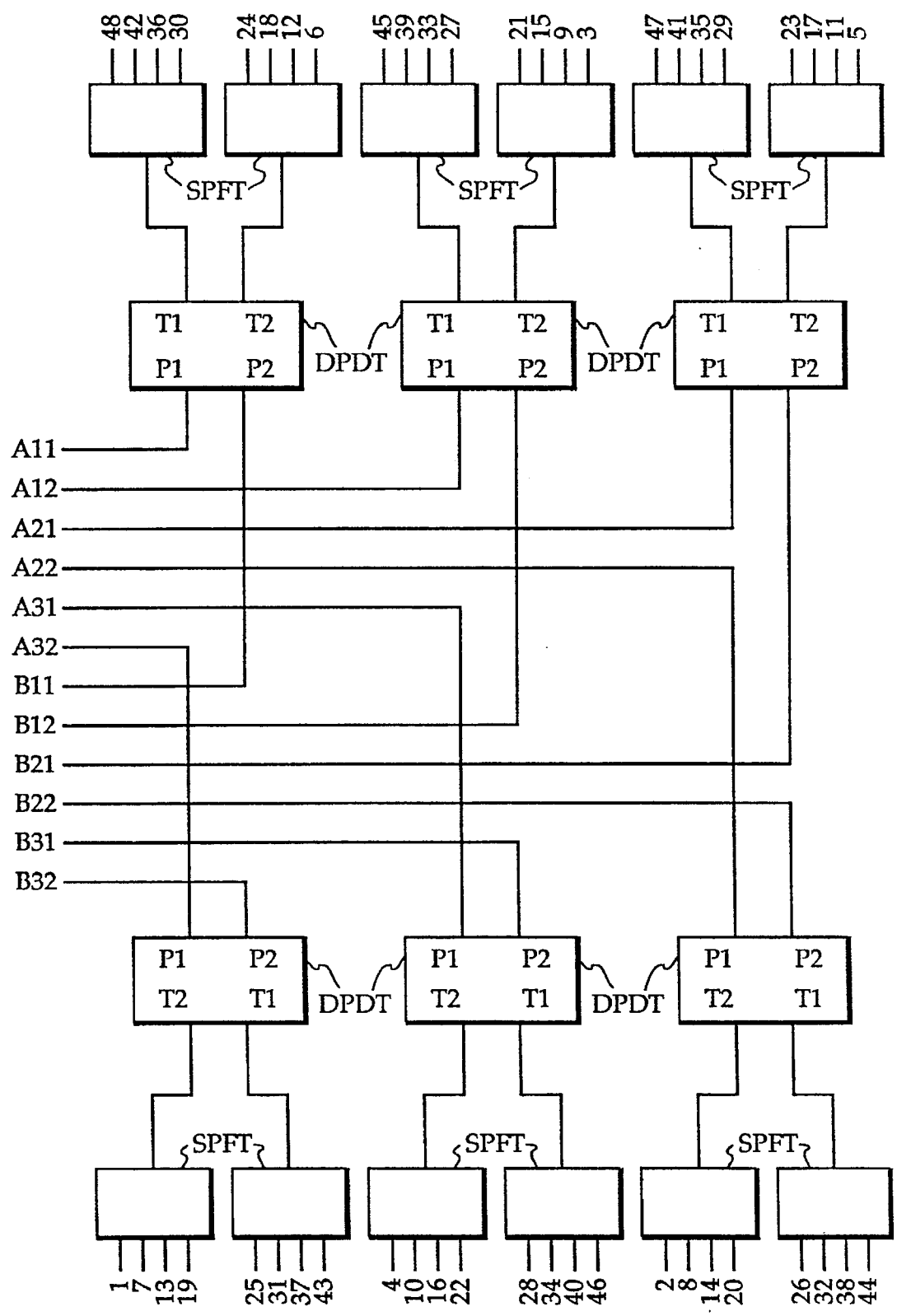
FIG. 5 illustrates a detailed block diagram of the switching means of the device of FIG. 1.

Referring now to FIGS. 4 and 5, the structure of the switching means SW is described on the assumption that two modulators are used of the type described above and shown in FIG. 4.

The switching means SW are organized on three hierarchic levels: the first level is formed by switches/dividers CD (FIG. 4) designed to carry out the switching of modulated message signals A1, A2, A3, B1, B2, B3 between logically adjacent antennas; the second level is formed by reversing switches DPDT (FIG. 5) designed to alternately feed the modulated message signals to the same antennas; the third level is formed by multiple switches SPFT (FIG. 5) to switch each of the modulated message signals between all the antennas of the array. All three types of switching devices (the switches/dividers CD, the reversing switches DPDT, the multiple switches SPFT) require control logic signals for their operation.

The six signals A1, A2, A3, B1, B2, B3, at the outputs of the two Buffer matrixes BM, are fed respectively to the inputs of six switches/dividers CD, each generating respectively two signals A11, A12, A21, A22, A31, A32, B11, B12, B21, B22, B31, B32.

Such signals are fed in pairs (A11 and B11, A12 and B12, etc.) respectively to the inputs P1 and P2 of six reversing DPDT switches (Double Pole Double Throw). The reversing DPDT switches have two outputs T1 and T2 and two operating conditions: input P1 connected to output T1 and, at the same time, input P2 connected to output T2, or input P1 connected to output T2 and, at the same time, input P2 connected to output T1.

Each output of reversing DPDT switches is fed to a different multiple switch (Single Pole Four Throw) SPFT and therefore the multiple switches are twelve. Multiple switches SPFT have one input and four outputs and obviously four operating conditions corresponding to the possible connections of the input with the outputs.

Finally, the outputs of the multiple switches are fed to the antennas, which in this instance are forty-eight. An example of the shape of the envelopes of signals fed to antennas E-1, E-2, E-3, E-4 (physically adjacent) is shown in FIG. 3.

By feeding suitable control logic signals to all these devices, it is possible to obtain the desired rotation effect.

What is claimed is:

1. A method of feeding a message signal to antennas of an antenna array, in particular of a Doppler VOR system, comprising the steps of:

performing a blending function that gradually switches said message signal between said antennas by using a modulated message signal generated by modulating the amplitude of said message signal with a periodic signal having a modulation index greater than 100%; and providing each antenna with a corresponding time fraction of said modulated message signal.

2. A method according to claim 1, characterized in that the method further includes the step of partially overlapping time fractions corresponding to different antennas.

3. A method according to claim 2, characterized in that the method further includes the step of:

feeding said modulated message signal during a first positive alternation of the amplitude modulation to a first antenna of said antenna array;

dividing the power of said modulated message signal during a first negative alternation following said first positive alternation and simultaneously feeding said modulated message signal to said first antenna and to a second antenna logically adjacent to said first antenna; and gradually feeding said modulated message signal during successive positive and negative alternations to the logically adjacent antennas until all the antennas of the antenna array receive the message signal.

4. A feeding device for a system provided with an antenna array, in particular a Doppler VOR system, comprising:

switching means for switching a modulated message signal between the antennas of said antenna array;

filter means for performing a blending function in order that said switching of a message signal between the antennas of the antenna array is gradual and wherein the filter means comprises at least one amplitude modulator capable of modulating said message signal with a periodic signal having a modulation index greater than 100% (percent) to generate the modulated message signal; and a control logic unit for controlling said switching means and said filter means.

5. A feeding device according to claim 4, characterized in that the control logic unit generates time fraction signals and that the switching means, in response to said time fraction signals, switches the modulated message signal to at least two antennas at the same time according to predetermined power ratios.

6. A feeding device according to claim 4, further comprising means for receiving two incoming signals corresponding to two sidebands of said message signal;

wherein said filter means comprises two modulators for modulating the two incoming signals, for outputting two modulated message signals; and wherein said switching means receives said two modulated message signals and outputs time fractions of said two modulated message signals respectively and successively to at least two different antennas of said antenna array.

7. A feeding device according to claim 6, characterized in that said switching means has three hierarchic levels, including a first level formed by switches/dividers to carry out the switching of said two modulated message signals between logically adjacent antennas, a second level formed by reversing switches to alternately feed said two modulated message signals to same antennas, and a third level formed by multiple switches to switch each of said two modulated message signals amongst all the antennas of said antenna array.

8. A feeding device according to claim 4, characterized in that said at least one amplitude modulator comprises:

a) a power divider (PD) having an input for receiving the message signal, and having a central output and two side outputs with predetermined power ratios with said input such that the power at the central output and the two side outputs are equal;

b) at least two phase shifters (PS1, PS2) controlled by phase-shift control signals, having inputs electrically connected to said two side outputs of said power divider (PD); and c) a Butler matrix (BM) having three inputs, an input −1, an input +1 and an input 0, with inputs −1 and +1 each connected to an output of one of the at least two phase shifters, and the input 0 connected to said central output of said power divider (PD).

9. A modulator according to claim 8, characterized in that said modulator further comprises an attenuator (VA) responsive to an attenuation control signal (CNTA), and further responsive to the central output of said power divider (PD), for providing an output signal to said input 0 of said Butler matrix (BM).

10. A Doppler VOR system having an antenna array, comprising:

switching means for switching a modulated message signal between antennas of said antenna array;

filter means for performing a blending function in order that said switching of the modulated message signal between the antennas of the antenna array is gradual and wherein the filter means comprises at least one amplitude modulator capable of modulating a message signal with a periodic signal having a modulation index greater than 100% (percent) to generate the modulated message signal; and a control logic unit for controlling said switching means and said filter means by providing to each antenna a corresponding time fraction of the modulated message signal.

* * * * *